(12) United States Patent
Haas et al.

(10) Patent No.: US 9,854,812 B2
(45) Date of Patent: Jan. 2, 2018

(54) BAKING OVEN

(75) Inventors: Johannes Haas, Vienna (AT); Josef Haas, Leobendorf (AT); Stefan Jiraschek, Koenigsbrunn (AT); Erich Koletnik, Klosterneuburg/Kierling (AT); Johann Sachsenhofer, Vienna (AT)

(73) Assignee: Haas Food Equipment GmbH, Vienna (AT)

( * ) Notice: Subject to any disclaimer, the term of this patent is extended or adjusted under 35 U.S.C. 154(b) by 215 days.

(21) Appl. No.: 14/116,798

(22) PCT Filed: May 8, 2012

(86) PCT No.: PCT/EP2012/058414
§ 371 (c)(1),
(2), (4) Date: Nov. 11, 2013

(87) PCT Pub. No.: WO2012/152778
PCT Pub. Date: Nov. 15, 2012

(65) Prior Publication Data
US 2014/0076176 A1  Mar. 20, 2014

(30) Foreign Application Priority Data
May 11, 2011 (AT) .................................. A672/2011

(51) Int. Cl.
*A47J 27/62* (2006.01)
*A21B 1/42* (2006.01)
(Continued)

(52) U.S. Cl.
CPC ................ *A21B 1/42* (2013.01); *A21B 5/023* (2013.01); *A21C 15/00* (2013.01)

(58) Field of Classification Search
CPC ....... A47J 37/049; A47J 37/042; A47J 37/047
(Continued)

(56) References Cited

U.S. PATENT DOCUMENTS 3,279,634 A * 10/1966 Temple .................... A21B 3/18
                                                             294/188
4,025,267 A    5/1977 Amato et al.
(Continued)

FOREIGN PATENT DOCUMENTS

AT      378470 B     8/1985
DE      3529770 A1   2/1987

*Primary Examiner* — Dana Ross
*Assistant Examiner* — Thomas Ward
(74) *Attorney, Agent, or Firm* — Laurence A. Greenberg; Werner H. Stemer; Ralph E. Locher

(57) ABSTRACT

An oven contains a continuous chain of baking tongs that can be opened and closed, and locked in the closed state. The chain circulates in the oven and moves through the baking chamber in two transport planes, one above the other. A device for opening the baking tongs, a delivery station, a loading station, a device for closing the baking tongs, and a device for locking the tongs are successively arranged in the running direction of the baking tongs, in the front part of the oven, along the upper transport plane. A product removal device contains a flatly arranged rotating support and is arranged in the delivery station. The rotating support carries removal elements embodied as suction elements along the outer periphery thereof, which it uses to remove the baked products from the open baking tongs.

22 Claims, 8 Drawing Sheets

(51) Int. Cl.
*A21B 5/02* (2006.01)
*A21C 15/00* (2006.01)

(58) Field of Classification Search
USPC ............. 99/420, 421, 427; 126/116 A, 21 R;
426/391, 443, 465
See application file for complete search history.

(56) References Cited

U.S. PATENT DOCUMENTS

| | | | |
|---|---|---|---|
| 4,438,685 A | | 3/1984 | Haas, Sr. et al. |
| 5,061,231 A | * | 10/1991 | Dietrich ................ B65B 43/265 |
| | | | 271/95 |
| 6,595,119 B1 | * | 7/2003 | Cheung ................. A47J 37/041 |
| | | | 99/386 |
| 7,036,426 B2 | * | 5/2006 | Cheung ................. A47J 37/041 |
| | | | 99/420 |
| 7,234,744 B2 | * | 6/2007 | Osten .................. B25J 15/0616 |
| | | | 294/65 |
| 2009/0200291 A1 | * | 8/2009 | Haas ........................ H05B 6/12 |
| | | | 219/622 |

* cited by examiner

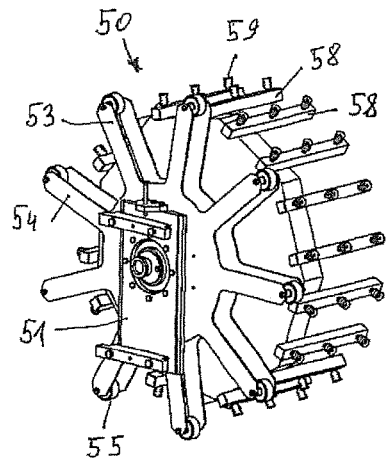
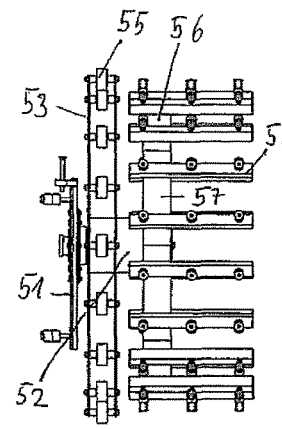
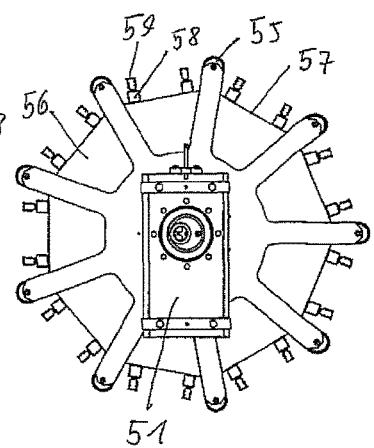
FIG. 4A    FIG. 4B    FIG. 4C
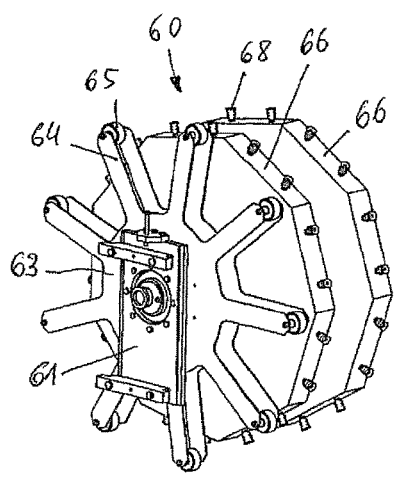
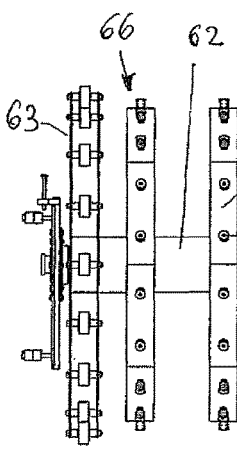
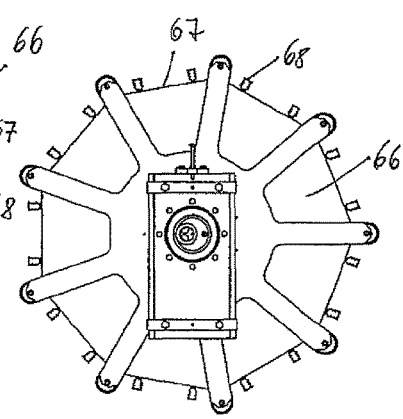
FIG. 5A    FIG. 5B    FIG. 5C

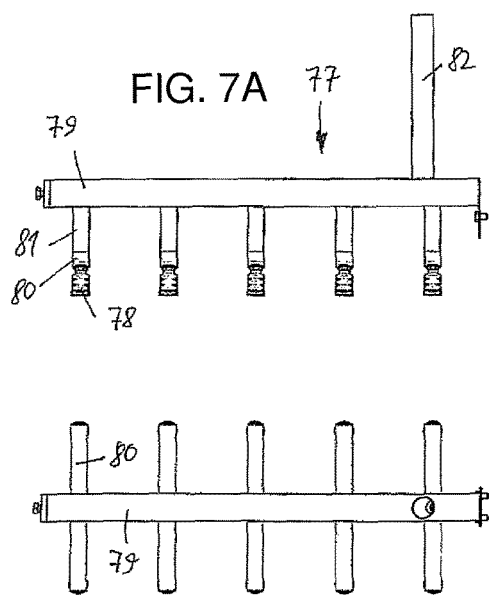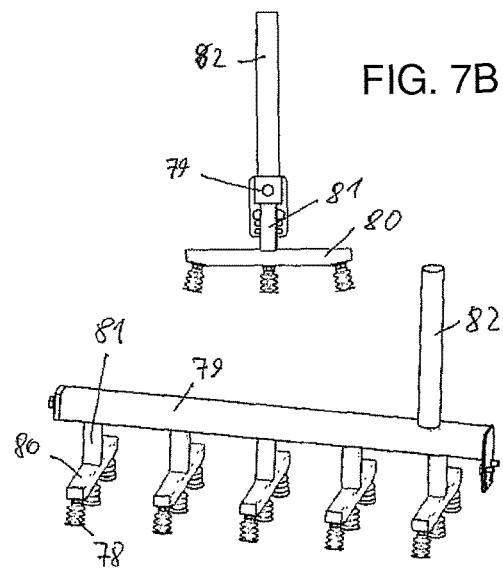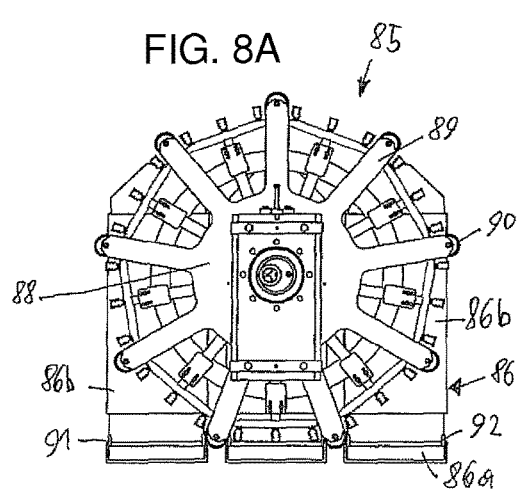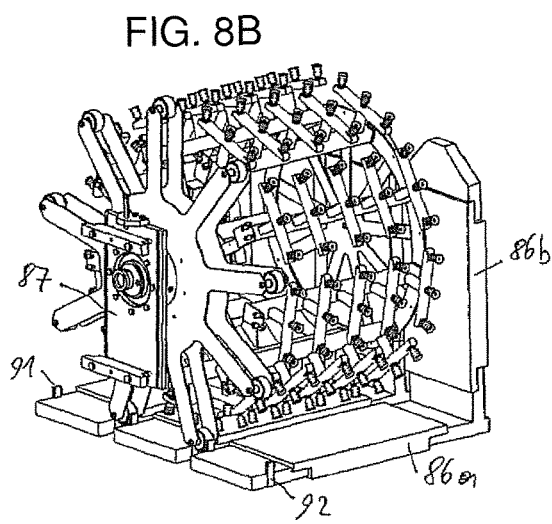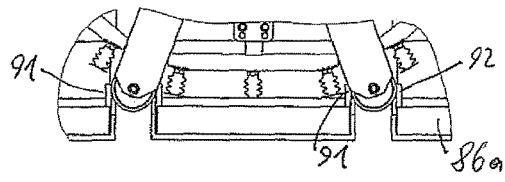

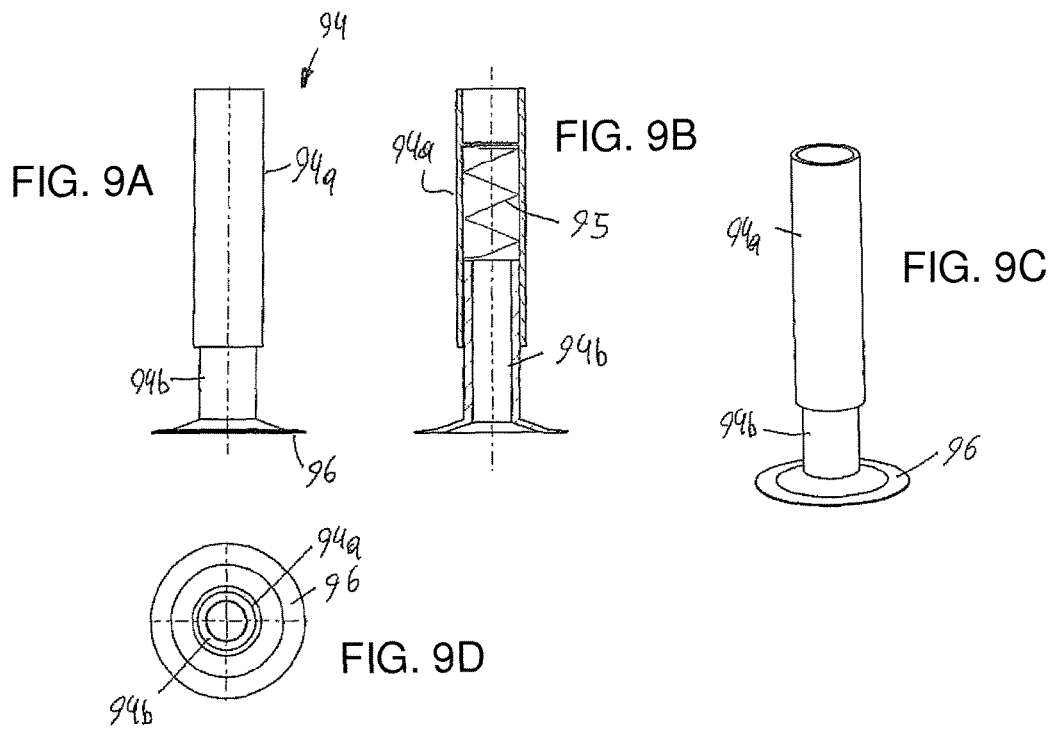
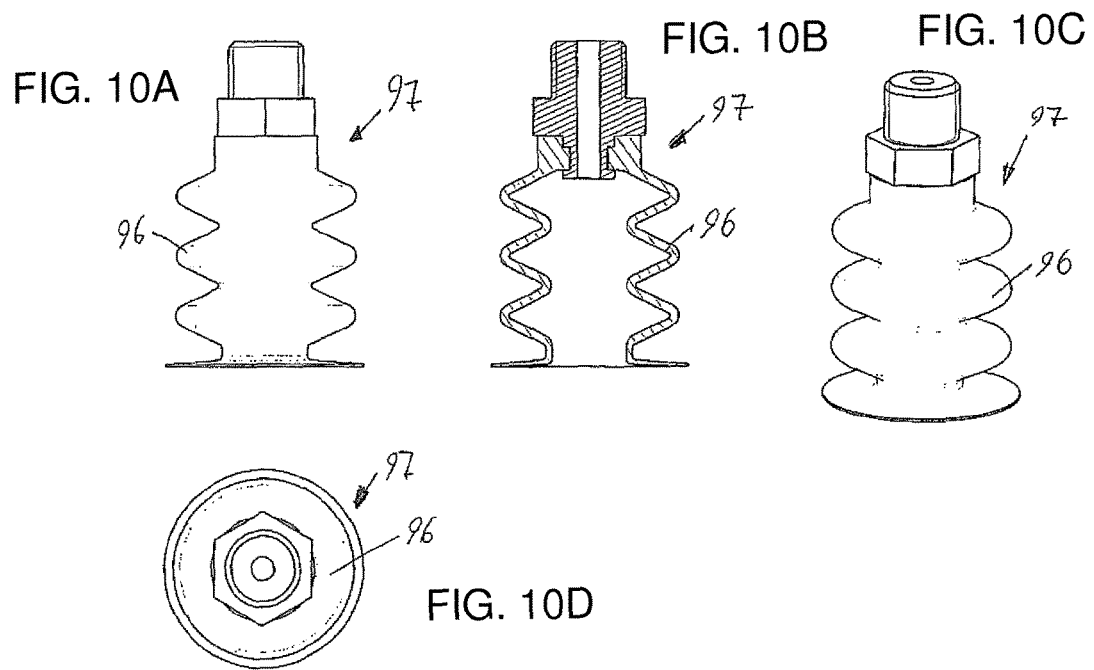

BAKING OVEN

BACKGROUND OF THE INVENTION

Field of the Invention

The invention relates to baking ovens having an endless baking tong chain circulating in the baking oven, which contains baking tongs comprising baking moulds consisting of baking mould upper parts and baking mould lower parts, which can be locked in their openable and closable state and in the closed state, in which crispy-brittle baked products produced by a baking process are formed.

The baking ovens each have a front oven part, a rear oven part, an oven frame provided with an external thermal insulation, a baking chamber disposed inside the thermal insulation and an endless baking tong chain circulating continuously in the baking oven and moving through the baking chamber. The baking tong chain is disposed in the baking oven along an orbit which is closed in itself, which extends in two superposed transport levels through both oven parts. The baking tong chain contains baking tongs which can be opened and closed, and which can be locked in the closed state, in which baking moulds consisting of baking mould upper parts and baking mould lower parts are disposed, which are opened by opening the baking tongs and closed by closing the baking tongs. Located in the front oven part of the baking oven is a device for unlocking the baking tongs on the orbit of the baking tong chain and along the upper transport level, a device for opening the baking tongs, a dispensing station, a loading station and a device for closing the baking tongs and a device for locking the baking tongs are disposed consecutively in the running direction of the baking tongs. Located in the dispensing station is a product removal device which removes the baked products from the opened baking tongs, which is followed by an upper transport device for the removed baked products.

In these baking ovens, flowable baking preparations are processed and converted by a baking process into baked products which are crispy and brittle at room temperature.

The baking preparations are produced in a mixer. In the mixer the liquid ingredients of the baking preparation and the solid or powdery ingredients of the baking preparation are blended with one another. A shapeless mass is thereby produced. The shapeless mass is flowable. It has a liquid, i.e., thin-liquid to thick-liquid, and sometimes also a pasty consistency. The liquid ingredients are principally water comprising a fraction of 42.0 to 60.0 wt. % of the baking preparation. The powdery ingredients are principally a starch-containing main component comprising a fraction of 36.0 to 56.5 wt. % of the baking preparation. Usually wheat flour is used as the starch-containing main component. The starch-containing main component can also be a starch flour or a mixture of wheat flour and starch flour or a mixture of various grain or starch flours.

The baked products produced from these baking preparations can be edible baked products such as, for example, wafers, crispy-brittle wafer sheets for producing wafer slices filled with cream, etc.

The baked products produced from these baking preparations can however also be products not provided for consumption per se. These products include, for example, packaging articles such as, for example, packaging cups produced from a starch-containing baking preparation or parts of disposable crockery produced from a starch-containing baking preparation such as, for example, plates and cups and also knives, forks and spoons.

The baking preparations are supplied as shapeless, liquid to pasty masses to the baking ovens, the baking tong chain of which contains openable and closable baking tongs provided with a locking device.

In the baking oven, the shapeless mass is conveyed by means of a dough pump through dough lines to the loading station. In the loading station the shapeless mass is divided into dough portions and the dough portions are introduced into the opened baking moulds located in the opened baking tongs which pass the loading station in the upper transport level of the baking oven. After introducing the dough portions, the baking tongs are closed. When closing the baking tongs, the baking moulds are closed and the dough portions enclosed in the baking moulds. After closing the baking tongs, the closed baking tongs are locked. The circulating baking tong chain conveys the closed and locked baking tongs through the baking chamber into the rear oven part. Whilst the baking tongs pass through the baking chamber, the baking tongs together with the baking moulds are heated and thereby heated up to baking temperatures between 150° C. (degrees Celsius) and 250° C. (degrees Celsius). As a result, the dough portions enclosed in the closed baking moulds are subjected to a baking process and baked under pressure in the closed and locked baking tongs. The circulating baking tong chain conveys the closed and locked baking tongs into the front oven part. There the closed baking tongs are unlocked. The circulating baking tong chain conveys the closed and unlocked baking tongs into the upper transport level. During passage through the upper transport level, the baking tongs are opened and conveyed in the opened state through the dispensing station to the input station. In the dispensing station the baked crispy-brittle products are removed in the hot state from the opened baking moulds located in the opened baking tongs. The baked products are dispensed in the hot state from the baking oven. The circulating baking tong chain conveys the opened baking tongs with the opened empty baking moulds to the loading station. In the loading station, the dough portions formed recently from the shapeless mass are introduced into the opened baking moulds.

Baking ovens in which baking moulds consisting of baking mould upper parts and baking mould lower parts in which the openable and closable baking tongs provided with a locking device of an endless baking tong chain circulating in the baking oven and moving through the baking chamber are arranged are known, for example from the documents AT 378 470 B1 and U.S. Pat. No. 4,438,685 A.

BRIEF SUMMARY OF THE INVENTION

It is the object of the invention to improve a baking oven of the type mentioned initially.

According to the invention a new baking oven is proposed. The new baking oven has a front oven part, a rear oven part, an oven frame provided with an external thermal insulation, a baking chamber disposed inside the thermal insulation and an endless baking tong chain which circulates continuously in the baking oven and moves through the baking chamber. The baking tong chain is disposed along an orbit closed in itself, which extends through two superposed transport levels through the two oven parts. The baking tong chain contains baking tongs which can be opened and closed and which can be locked in the closed state, in which baking moulds consisting of baking mould upper parts and baking mould lower parts are disposed, which are opened by opening the baking tongs and closed by closing the baking tongs. In the front oven part a device for unlocking the baking tongs is disposed on the orbit of the baking tong chain. Along the upper transport level, a device for opening the baking tongs, a dispensing station, a loading station and a device for closing the baking tongs and a device for locking the baking tongs are disposed consecutively in the running direction of the baking tongs. In the dispensing station there is provided a product removing device which removes the baked products from the opened baking tongs, which is followed by an upper transport device for the removed baked products.

The new baking oven is characterised according to the invention in that the product removal device has a horizontally disposed rotary unit which is rotatable about a horizontal axis of rotation, which projects into the opened baking tongs, that the rotary unit carries removal elements disposed along its outer circumference, which are disposed consecutively on the outer circumference of the rotary unit in at least one longitudinal row extending along the circumference of the rotary unit and that the removal elements are configured as suction elements connected to a vacuum source.

In this baking oven it can further be provided according to the invention that the horizontally disposed rotary unit is disposed in a height-adjustable manner in the front oven part. Furthermore, the horizontally disposed rotary unit can have outwardly projecting drive lugs on its outer circumference, which in the baking tong chain engage in the intermediate spaces of the baking tong chain disposed between the baking tongs.

In the baking oven according to the invention, the baked products formed in the closed baking tongs are removed from the circulating opened baking tongs at the dispensing station of the baking oven. In the opened baking tongs the baked products lie on the baking mould lower parts of the opened baking moulds located in the tong lower parts of the baking tongs.

Removal is accomplished by the product removal device or by the horizontally disposed rotating rotary unit of the product removal device. The horizontally disposed rotary unit rotates about its horizontally disposed central axis and removes the baked products from the opened baking tongs without deforming the baked products.

The rotating rotary unit grips the product pieces lying on the baking mould lower parts with its removal elements. The removal elements of the rotary unit are configured as suction elements which are connected to a vacuum source. The vacuum produced by a vacuum source acts via the removal elements of the rotary unit configured as suction elements directly on the product pieces lying on the baking mould lower parts. The product pieces are gripped individually. Each product piece is gripped by at least one suction element and held firmly on the rotary unit. The product piece is removed from the opened baking tong by the rotating movement of the rotary unit and conveyed to the upper transport device by the rotating movement of the rotary unit. The product piece is gripped by means of the vacuum applied to the suction element. When transferring the product piece to the upper transport device, the vacuum acting on the product piece via the suction element is interrupted.

According to the invention, the horizontally disposed rotary unit can be arranged in a height-adjustable manner in the front oven part. This configuration allows the position of the horizontal axis of rotation of the rotary unit to be varied inside the oven frame. As a result, on the underside of the rotary unit the distance between the removal elements disposed on the circumference of the rotating rotary unit and the horizontally disposed tong lower parts of the opened baking tongs can be adjusted or varied.

The height-adjustable arrangement of the rotary unit allows the height position of the rotary unit to be adjusted on the upper side of the baked products which, in the opened baking tongs, lie on the baking mould lower parts disposed in the tong lower parts of the baking tongs.

According to the invention, the horizontally disposed rotary unit can have outwardly projecting drive lugs on its outer circumference which, in the circulating baking tong chain, engage in the intermediate spaces of the baking tong chain located between the baking tongs. This configuration provides a direct drive of the horizontally disposed rotary unit through the baking tong chain circulating in the baking oven which is driven and set in motion by the main drive of the baking oven.

According to a further feature of the invention, it can be provided that the rotary unit has at least two product carrying arms, which are disposed at a distance from one another along the circumference of the rotary unit and that each product carrying arm carries at least one removal element configured as a suction element.

The rotary unit with its product carrying arms is assigned to the baked product pieces located in the tong lower parts of the opened baking tongs which pass successively through the dispensing station of the baking oven. Each product carrying arm is assigned to a product piece. The product carrying arm grips the product piece with its removal element configured as a suction element. The product piece is removed from the opened baking tong by the rotating movement of the rotary unit and conveyed to the upper transport device.

The rotary unit can have product carrying arms arranged consecutively in the direction of rotation, which are assigned to the product pieces arranged consecutively in the tong lower part of an opened baking tong.

According to a further feature of the invention, it can be provided that the product carrying arm has at least one rod which carries at least two removal elements configured as suction elements, which are disposed along the rod at a distance from one another. In this configuration, each product piece is gripped by two or more removal elements of a product carrying arm configured as a suction element and held firmly by vacuum on the rotary unit. The product piece abuts against the product carrying arm and is removed from the opened baking tong by the rotating movement of the rotary unit.

According to a further feature of the invention, it can be provided that the product carrying arm has at least one longitudinal rod disposed parallel to the axis of rotation of the rotary unit, which carries at least one removal element configured as a suction element. In this configuration, the product carrying arms disposed along the circumference of the rotary unit at a distance from one another are aligned parallel to the axis of rotation of the rotary unit.

According to a further feature of the invention, the longitudinal rod of the product carrying arm parallel to the axis of rotation of the rotary unit can carry at least two removal elements configured as suction elements, which are disposed along the longitudinal rod at a distance from one another.

This configuration of the rotary unit allows a single broad product piece or two adjacently disposed product pieces to be removed with a single product carrying arm from a tong lower part of an opened baking tong.

According to a further feature of the invention, it can be provided that the product carrying arm has at least two longitudinal rods disposed parallel to the axis of rotation of the rotary unit, which are disposed in a reference plane parallel to the axis of rotation of the rotary unit, and that the longitudinal rods carry removal elements configured as suction elements, which are disposed perpendicular to the reference plane.

This configuration of the rotary unit is advantageous for the manipulation of plate-shaped product pieces which are gripped by the two longitudinal rods of the product carrying arm in each case close to the front or rear edge of the product piece. The product carrying arm can also have three or more longitudinal rods each carrying a plurality of removal elements configured as suction elements, which are arranged along the respective longitudinal rod at a distance from one another and are each arranged perpendicular to the reference plane formed by the longitudinal rods.

According to a further feature of the invention, it can be provided that the product carrying arm has a longitudinal rod arranged parallel to the axis of rotation of the rotary unit, which carries at least one transverse rod disposed transversely to the longitudinal rod, which is disposed in a reference plane parallel to the axis of rotation of the rotary unit, and that the transverse rod carries two or more removal elements configured as suction elements, which are disposed along the transverse rod at a distance from one another and are each arranged perpendicular to the reference plane.

This configuration is advantageous when manipulating broad product pieces. These are each gripped at two or more places by the product carrying arm and the removal elements configured as suction elements hold them firmly on the transverse rod of the product carrying arm.

According to a further feature of the invention, in a product carrying arm of the rotary unit, it can be provided that the longitudinal rod carries two or more transverse rods disposed at a distance from one another, which are disposed in a reference plane parallel to the axis of rotation of the rotary unit, and that each transverse rod carries at least two removal elements configured as suction elements, which are disposed at a distance from one another along the transverse rod and are each disposed perpendicular to the reference plane.

This configuration is advantageous for the manipulation of large plate-shaped product pieces. The product carrying arm grips each product piece at several places simultaneously. The removal elements exposed to vacuum, which are configured as suction elements, hold the product piece firmly on the transverse rods of the product carrying arm. The product piece held firmly on the product carrying arm is removed from the opened baking tongs by the rotating movement of the rotary unit.

According to a further feature of the invention, it can be provided that in a product carrying arm of the rotary unit, the product carrying arm has at least two longitudinal rods disposed parallel to the axis of rotation of the rotary unit, which are disposed in a reference plane parallel to the axis of rotation of the rotary unit and that the product carrying arm has at least two transverse rods disposed transversely to the longitudinal rods which each carry at least two removal elements configured as suction elements, which are disposed at a distance from one another along the transverse rod and are each disposed perpendicular to the reference plane.

This configuration is advantageous for the manipulation of large-area plate-shaped product pieces. For the manipulation of very large, plate-shaped product pieces, three, four, five or even more transverse rods arranged at a distance from one another can be attached to the longitudinal rods of the product carrying arm, which are each arranged parallel to the reference plane. Each transverse rod can carry three, four, five or even more removal elements configured as suction elements arranged at a distance from one another, which are each aligned perpendicular to the reference plane parallel to the transverse rods. The product piece gripped by this product carrying arm abuts against the transverse rods of the product carrying arm. The vacuum acting on the product piece via the removal elements attached to the transverse rods, which are configured as suction elements hold the product piece firmly on the product carrying arm. The product piece is removed from the opened baking tongs by the rotating movement of the rotary unit.

According to a further feature of the invention, it can be provided that the product-carrying arms are each configured as hollow profiles and form a part of the suction lines which lead from the removal elements configured as suction elements, attached to the product carrying arms, to a vacuum source. In this configuration of the rotary unit, the suction lines leading from the removal elements configured as suction elements to the vacuum source run inside the hollow rods of the product carrying arms.

According to a further feature of the invention, it can be provided that the removal elements disposed on the circumference of the rotary unit are configured as suction cups preferably each provided with an elastic bellows, which are attached to the product carrying arms and are connected via suction lines to a vacuum source.

According to a further feature of the invention, it can be provided that the removal elements disposed on the circumference of the rotary unit are configured as suction sleeves which can be pushed together elastically into themselves, which are attached to the product carrying arms and are connected via suction lines to a vacuum source.

According to a further feature of the invention, it can be provided that the horizontally disposed rotary unit has at least one vertically disposed rotary star which carries removal elements configured as suction elements, disposed on the circumference of the rotary unit, and that the horizontally disposed rotary unit possesses possibly two or more rotary stars disposed adjacent to one another at a distance, which carry removal elements configured as suction elements, disposed on the circumference of the rotary unit.

In this configuration of the rotary unit, the product pieces are removed from the opened baking tongs by the vertically disposed rotary star of the rotating rotary unit. The removal elements configured as suction elements, attached to the rotary star are each exposed to vacuum. The product pieces are gripped by the removal elements by means of vacuum and held firmly by means of vacuum on the rotary star. The product pieces are removed from the opened baking tongs by the rotating movement of the rotary star and conveyed to the upper transport device located downstream of the rotary unit.

According to the invention, the horizontally disposed rotary unit can have two or more rotary stars arranged adjacent to one another which carry removal elements configured as suction elements, disposed on the circumference of the rotary unit.

In this configuration, the removal elements of the rotary unit configured as suction elements are disposed on the outer side of the rotary stars. The removal elements are disposed consecutively on the outer side of the rotary stars in longitudinal rows extending along the circumference of the rotary unit. At the same time, the removal elements are disposed in transverse rows parallel to the axis of rotation of the rotary unit. Individual large-area product pieces or adjacently disposed smaller product pieces can be removed from the opened baking tongs with the adjacently disposed rotary stars.

According to a further feature of the invention, it can be provided that the vertically disposed rotary star has an outer circumference configured as a polygon, in which the removal elements configured as suction elements are disposed on the straight segments.

According to a further feature of the invention, it can be provided that in each case at least two removal elements configured as suction elements are disposed at a distance from one another on the straight segments of the outer circumference.

According to a further feature of the invention, it can be provided that the rotary star is configured as a hollow body and forms a part of the suction line which leads from the removal elements configured as suction elements to a vacuum source.

According to a further feature of the invention, it can be provided that the removal elements of the rotary unit configured as suction elements are configured as suction cups preferably each provided with an elastic bellows, which are attached to the outer circumference of a rotary star and connected via suction lines to a vacuum source.

According to a further feature of the invention, it can be provided that the removal elements of the rotary unit configured as suction elements are configured as suction sleeves which can be pushed elastically into themselves, which are attached to the outer circumference of a rotary star and connected via suction lines to a vacuum source.

BRIEF DESCRIPTION OF THE SEVERAL VIEWS OF THE DRAWING

The invention is explained in detail hereinafter with reference to exemplary embodiments by means of the drawings. In the drawings:

FIG. 4a to 4c show a first rotary unit

FIG. 5a to 5c show a second rotary unit

FIGS. 7a to 4d show a product carrying arm

FIGS. 8a to 8d show another rotary unit

FIGS. 9a to 9d show a first removal element and

FIGS. 10a to 10d show a second removal element.

DESCRIPTION OF THE INVENTION

Figure 1:
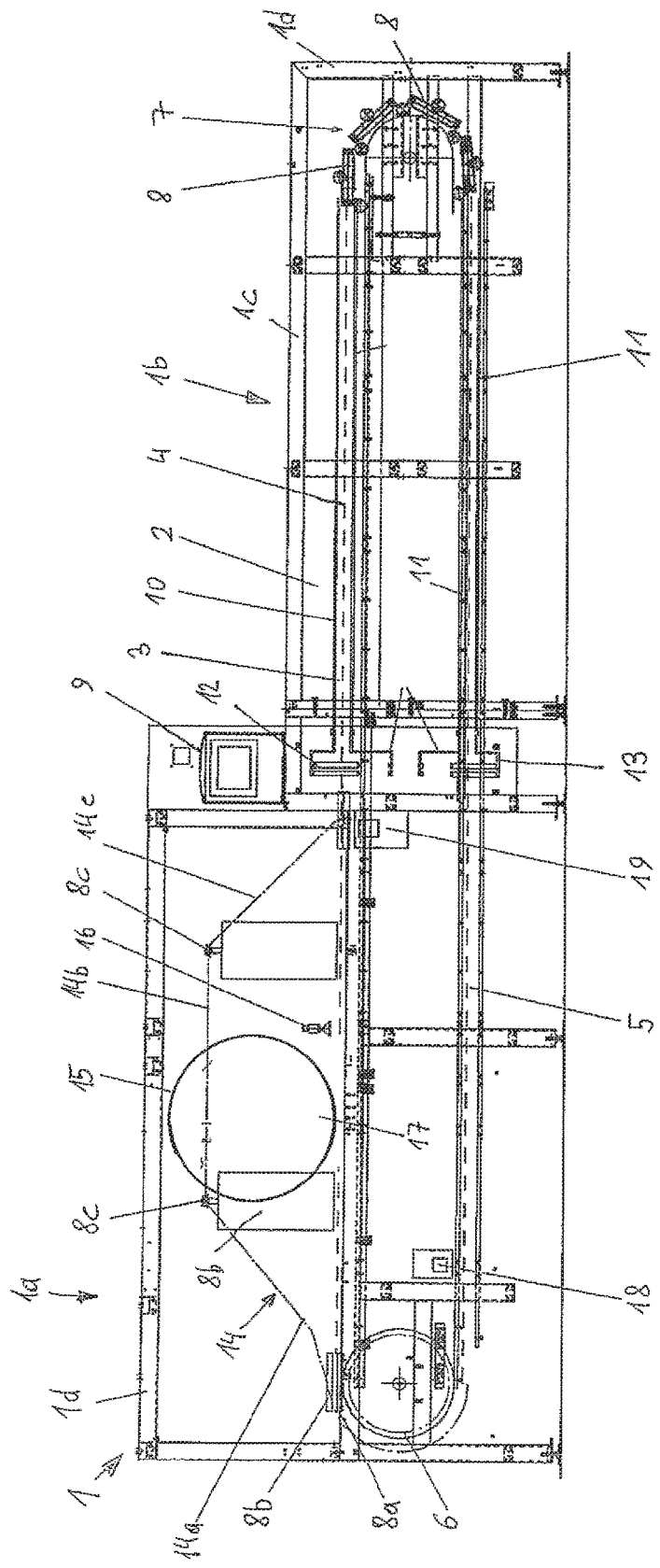
FIG. 1 shows schematically a first baking oven from the side.

FIG. 1 shows schematically a first baking oven 1 from the side. The baking oven 1 has a front oven part 1a, a rear oven part 1b, an oven frame 1d provided with an external thermal insulation 1c, furthermore a baking chamber 2 located inside the thermal insulation and an endless baking tong chain 3 circulating continuously in the baking oven 1 and moving through the baking chamber 2. The endless baking tong chain 3 is located in the baking oven 1 along an orbit which is closed in itself, which extends in two superposed transport levels 4 and 5 through both oven parts 1a and 1b. The baking tong chain 3 is driven by a drive wheel 6 located close to the front end of the baking oven 1 and is deflected by the drive wheel 6 from the lower transport level 5 upwards into the upper transport level 4. The circulating baking tong chain 3 moves in the upper transport level 4 away from the drive wheel 6 in the baking oven towards the back. Close to the rear end of the baking oven 1 the baking tong chain 3 passes a rear baking tong chain deflecting device 7. At the deflecting device 7 the baking tong chain 3 is deflected from the upper transport level 4 downwards into the lower transport level 5.

The baking tong chain 3 contains openable and closable baking tongs 8. The baking tongs 8 are arranged one after the other in the baking tong chain 3. Located in the baking tongs 8 are baking moulds consisting of baking mould upper parts and baking mould lower parts, which are opened by opening the baking tongs 8 and closed by closing the baking tongs 8. The baking tongs 8 each consist of a tong lower part 8a and a tong upper part 8b connected pivotably to this. A control roller 8c is attached to the tong upper part 8b by means of which the baking tong 8 is opened and closed. Flat baking plates are disposed in the tong lower parts 8a, which contain the baking mould lower parts of the baking moulds. Flat baking plates are disposed in the tong upper parts 8b which contain the baking mould upper parts of the baking moulds.

On their front sides, the baking tongs 8 are provided with locking devices, not shown in the drawing, which are actuated when the baking tongs are closed in order to keep the baking moulds disposed in the closed baking tongs closed during the entire baking process The baking oven 1 is provided with an electrical induction heater. This includes an alternating current generator 9 located next to the front oven part 1a and elongated inductors 10, 11 located in the baking chamber 2. The alternating current generator 9 is connected to the inductors 10, 11 via power leads 12, 13 and supplies these with current. The elongated inductors 10, 11 are located in the baking chamber 2 above and below the orbit of the baking tong chain 3. The flat baking plates contained in the baking tongs 8 are configured as susceptor plates which are heated inductively in a contact-free manner by the magnetic fields generated by the inductors 10, 11.

A lower actuating device 18 for unlocking the locking devices of the baking tongs 8 is located in the front oven part 1a on the lower transport level 5.

In the front oven part 1a, a linkage 14 for engagement with the control rollers 8c of the baking tongs 8 is provided along the upper transport level 4. The linkage 14 provides three consecutive sections in the running direction of the baking tongs 8. The linkage 14 provides a gradually ascending linkage section 14a which forms a device for opening the baking tongs 8. The linkage section 14a is adjoined by an upper horizontal linkage section 14b. This holds the opened baking tongs 8 in the opened state whilst they pass the dispensing station 15 of the baking oven 1 and the adjoining loading station 16. The linkage section 14b is adjoined by a gradually descending linkage section 14c which forms a device for closing the baking tongs 8. Located at the end of the linkage 14 is an upper actuating device 19 for locking the locking devices of the baking tongs 8.

The product removal device 17 which projects into the opened baking tongs 8, shown only schematically in FIG. 1, is provided in the dispensing station 15. The product removal device 17 removes the baked products from the tong lower parts 8a of the opened baking tongs 8 and transfers them to an upper transport device, not shown in FIG. 1, by which the baked products are conveyed out of the baking oven 1.

During operation of the baking oven 1 a baking preparation is introduced in individual dough portions into the circulating opened baking tongs 8 in the loading station 16. After leaving the loading station 16, the baking tongs 8 with the control rollers 8c move along the gradually descending linkage section 14c. At the same time the tong upper parts 8b are folded downwards to the tong lower parts 8a and the baking tongs 8 are closed. During closure of the baking tongs 8 the baking moulds contained in the baking tongs 8 are closed and the dough portions enclosed in the closed baking moulds. After closure of the baking tongs 8 the locking devices of the baking tongs 8 are actuated by lower actuating device 19 and the closed baking tongs 8 are locked. The closed and locked baking tongs 8 are conveyed by the circulating baking tong chain 3 through the baking chamber 2. In the baking chamber 2 the baking moulds are heated inductively in a contact-free manner and the dough portions enclosed in the baking moulds are baked. The closed and locked baking tongs 8 are conveyed with the baked dough portions contained therein by the circulation baking tong chain 3 in the lower transport level 5 in the baking oven 1 forwards to the drive wheel 6. When passing the lower actuating device 18, the locking devices of the baking tongs 8 are actuated by the lower actuating device 18 and the closed baking tongs 8 are unlocked. The closed and unlocked baking tongs 8 are conveyed along the drive wheel 6 into the upper transport level 4. In the upper transport level 4 the baking tongs 8 with their control rollers 8c move along the gradually ascending linkage section 14a. At the same time, the baking tongs 8 are opened and the tong upper part 8b folded upwards. The baked dough portions or the baked products remain in the tong lower part 8a of the opened baking tongs 8. In the dispensing station 15 the baked products are removed by the product removal device 17 from the tong lower parts 8a of the opened baking tongs 8.

Figure 2:
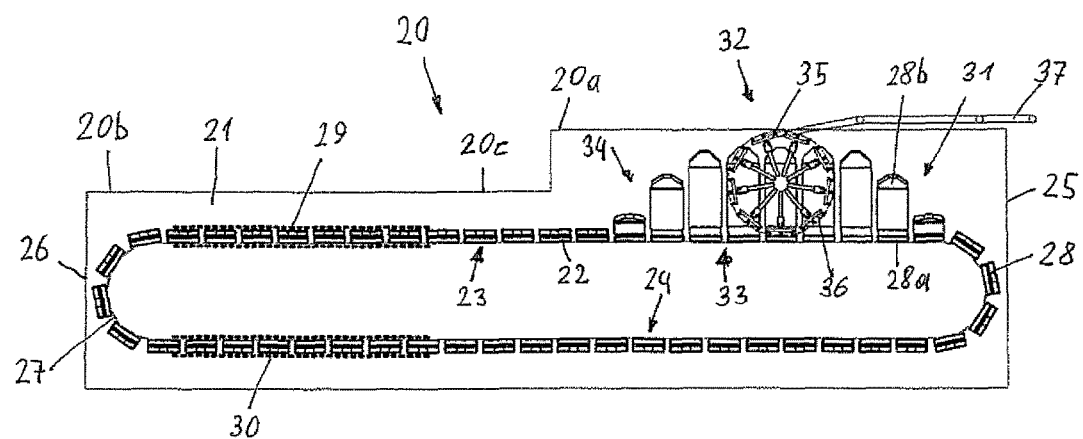
FIG. 2 shows schematically a second baking oven from the side.

FIG. 2 shows schematically a second baking oven 20 from the side. The baking oven 20 has a front oven part 20a, a rear oven part 20b, an oven frame provided with external thermal insulation 20c, a baking chamber 21 disposed inside the thermal insulation 20c and an endless baking tong chain 22 circulating continuously in the baking oven 20 and moving through the baking chamber 21. The baking tong chain 22 is disposed in the baking oven 20 along an orbit which is closed in itself which extends in two superposed transport levels 23 and 24 through both oven parts 20a and 20b. The baking tong chain 22 is driven by a drive wheel, not shown in FIG. 2, located near the front end 25 of the baking oven 20 and is deflected by the drive wheel from the lower transport level 24 upwards into the upper transport level 23. The circulating baking tong chain 22 moves in the upper transport level 23 from the front end 25 of the baking oven 20 towards the rear to the rear end 26 of the baking oven 20. The baking tong chain 22 is deflected near the rear end 26 of the baking oven 20 by a rear baking tong chain deflecting device 27 from the upper transport level 23 downwards into the lower transport level 24.

The baking tong chain 22 contains openable and closable baking tongs 38 in which baking moulds consisting of baking mould upper parts and baking mould lower parts are disposed, which are opened by opening the baking tongs 28 and closed by closing the baking tongs 28. The baking tongs 28 each have a tong lower part 28a and a tong upper part 28b connected pivotably thereto. Attached to the tong upper part 28b is a control roller, not shown in FIG. 2, by which means the baking tongs 28 are opened and closed. Flat baking plates are disposed in the tong lower parts 28a which contain the baking mould lower parts of the baking moulds. Flat baking plates are disposed in the tong upper parts 28b which contain the baking mould upper parts of the baking moulds.

The baking chamber 21 is disposed in the rear oven part 20b. The baking chamber 21 is provided with an electrical induction heater which includes elongated inductors 29, 30 each disposed above and below the orbit of the baking tongs 28 in the two transport levels 23 and 24.

In the front oven part 20a of the baking oven 20, a device 31 for opening the baking tongs 28, a dispensing station 32, a loading station 33 and a device 34 for closing the baking tongs 28 are disposed consecutively in the running direction of the baking tongs 28 along the upper transport level 23. Located in the dispensing station 32 is a product removal device 35 with a horizontally disposed rotary unit 36. The rotary unit 36 rotates about its horizontally disposed central axis and removes the baked products from the opened baking tongs 28a and conveys them to an upper transport device 37 which conveys the baked products out from the baking oven 20.

Figure 3:
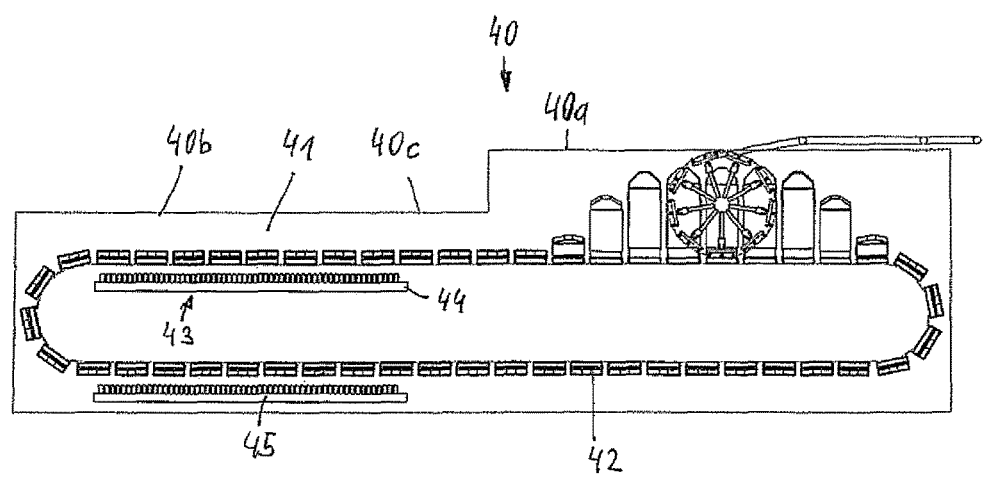
FIG. 3 shows schematically a third baking oven from the side.

FIG. 3 shows schematically a third baking oven 40 from the side. The baking oven 40 has a front oven part 40a, a rear oven part 40b, an oven frame provided with external thermal insulation 40c, a baking chamber 41 disposed inside the thermal insulation 40c in the rear oven part 40b and an endless baking tong chain 42 circulating continuously in the baking oven 40 and moving through the baking chamber 41. The baking oven 40 corresponds in its design structure to the baking oven 20 of FIG. 2 and only differs from this by the baking chamber heating which is configured as gas heating 43 in the baking oven 40. The gas heating 43 includes elongated gas burners 44 and 45 which are disposed in the baking chamber 41 below the orbit of the baking tong chain 42.

FIGS. 4a to 4c show a first embodiment of the horizontally disposed rotary unit of the product removal device. FIG. 4a shows the rotary unit 50 in an oblique view from the rear side. FIG. 4b shows the rotary unit 50 in its working position. FIG. 4c shows the rear side of the rotary unit 50.

The rotary unit 50 is mounted rotatably on its rear side in a retaining device 51 fastened to the oven frame. The retaining device 51 is fastened to the oven frame in a height-adjustable manner. The rotary unit 50 has a horizontally disposed hollow shaft 52. The rear drive star 53 of the rotary unit 50 sits on the hollow shaft 52, which has arms 54 arranged in a star shape, which carry drive rollers 55 mounted rotatably at their end sections, which engage in the intermediate spaces between the successive baking tongs of the circulating baking tong chain.

A vertically disposed rotary star 56 is fastened to the front end of the hollow shaft 52. The rotary star 56 is configured as a hollow body. The interior of the hollow star 56 is connected to the cavity of the hollow shaft 52. The outer circumference of the rotary star 56 is configured as a polygon. Respectively two adjacently disposed longitudinal rods 58 parallel to the hollow shaft 52 are fastened to the straight segments 57 of the polygon. The longitudinal rods 58 are configured as hollow profiles and each carry three removal elements 59 disposed at a distance from one another. Each removal element 59 is configured as a suction element and is connected via a suction line to a vacuum source. The suction line runs inside the rotary unit 50 from the removal element 59 through the hollow longitudinal rod 58 and the hollow rotary star 56 to the hollow shaft 52 and through the hollow shaft 52 out from the rotary unit 50. The removal elements 59 fastened to the longitudinal rods 58 are configured as suction cups provided with an elastic bellows.

The two longitudinal rods 58 fastened to the straight segment 57 of the outer circumference in the rotary star 56 are disposed in a reference plane parallel to the axis of rotation of the rotary unit 50. The suction cups attached to the two longitudinal rods 58, which are provided with an elastic bellows are disposed perpendicular to the reference plane. The two longitudinal rods 58 together form a product carrying arm of the rotary unit 50. The rotary unit 50 has nine such product carrying arms which are disposed at a distance from one another along the circumference of the rotary unit 50.

FIGS. 5a to 5c show a second embodiment of the horizontally disposed rotary unit of the product removal device. FIG. 5a shows the rotary unit 60 in an oblique view from the rear side. FIG. 5b shows the rotary unit 60 in its working position. FIG. 5c shows the rear side of the rotary unit 60.

The rotary unit 60 is rotatably mounted at its rear side in a retaining device 61 fastened to the oven frame. The retaining device 61 is fastened in a height-adjustable manner on the oven frame. The rotary unit 60 has a horizontally disposed hollow shaft 62. The rear drive star 63 of the rotary unit 60 sits on the hollow shaft 62, which has arms 64 arranged in a star shape, which carry drive rollers 65 mounted rotatably at their end sections, which engage in the intermediate spaces between the successive baking tongs of the circulating baking tong chain.

The rotary unit 60 has two vertically disposed rotary stars 66 configured as hollow bodies, the interior of each is connected to the cavity of the hollow shaft 62. The outer circumference of the rotary stars 66 is configured as a polygon. Respectively two removal elements 68 disposed at a distance from one another are attached to each straight segment 67 of the polygon, which are configured as suction cups provided with an elastic bellows and which are connected via the hollow rotary stars 66 to a vacuum source.

Figures 6A, 6B, 6C:
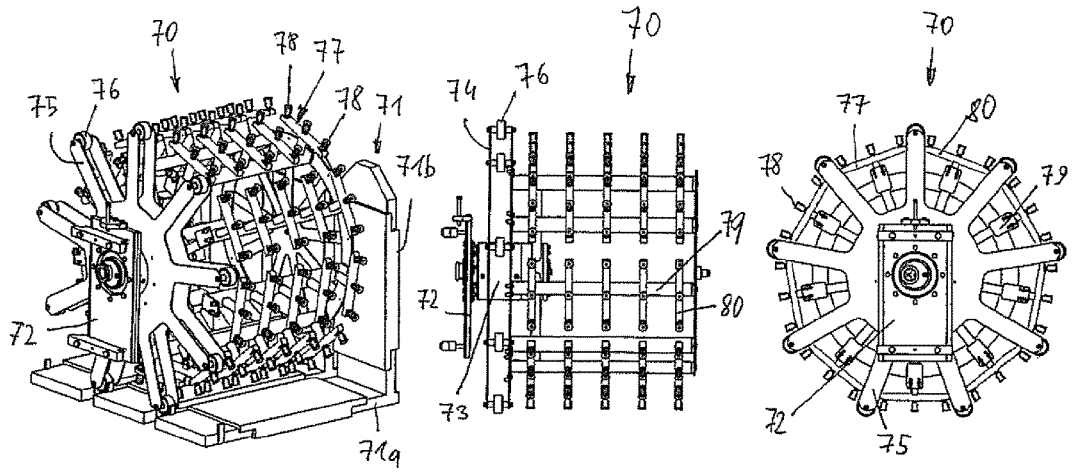
FIG. 6a to 6g show a third rotary unit
Figures 6D, 6E:
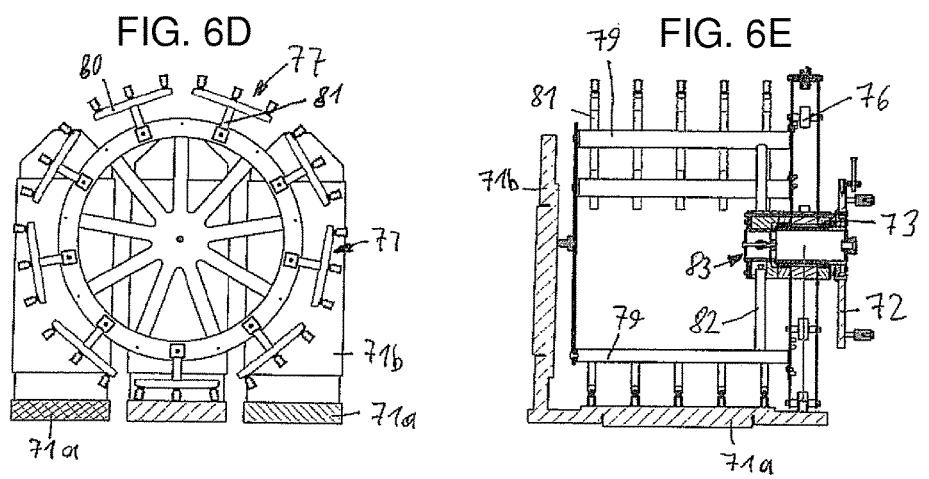
Figures 6F, 6G:
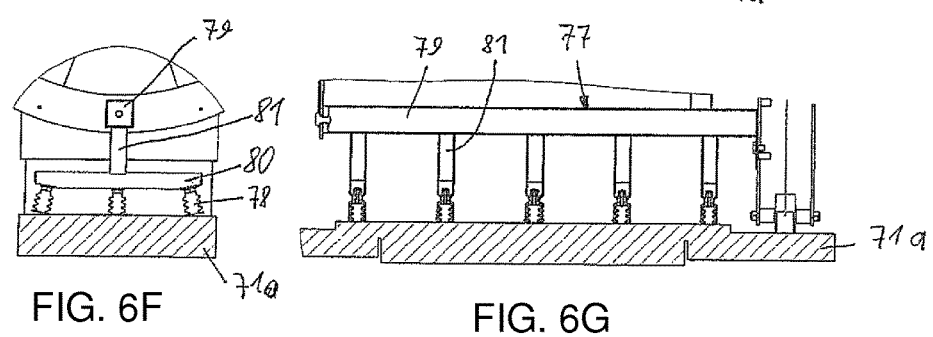

FIGS. 6a to 6g show a third embodiment of the horizontally disposed rotary unit of the product removal device. FIG. 6a shows the rotary unit 70 projecting into the opened baking tongs of a baking oven in an oblique view from the rear side. FIG. 6b shows the rotary unit 70 in its working position without baking tongs. FIG. 6c shows the rear side of the rotary unit 70. FIG. 6d shows the rotary unit 70 projecting into the opened baking tongs of a baking oven in a vertical section perpendicular to the axis of rotation of the rotary unit 70. FIG. 6e shows the rotary unit 70 projecting into the opened baking tongs of a baking oven in a vertical section through the axis of rotation of the rotary framework 70. FIG. 6f shows, in a vertical section, a product carrying arm of the rotary unit 70 in an opened baking tong above the tong lower part of the baking tong. FIG. 6g shows a side view of FIG. 6f.

The rotary unit 70 shown in FIG. 6a projects into three successive opened baking tongs 71 of a baking oven. FIG. 6a only shows the opened baking tongs 71 schematically. The rotary unit 70 is disposed in the opened baking tongs 71 above the tong lower parts 71a and extends with its front side close to the folded-upwards tong upper parts 71b. The rotary unit 70 is rotatably mounted on its rear side in a retaining device 72 fastened to the oven frame. The retaining device 72 is fastened to the oven frame in a height-adjustable manner. The rotary unit 70 has a short horizontal hollow shaft 73. A drive star 74 disposed on the rear side of the rotary unit 70 sits on the hollow shaft 73, which has arms 75 arranged in a star shape which carry rotatably mounted drive rollers 76 at its end sections, which engage in the intermediate spaces between the consecutive baking tongs 71 of the circulating baking tong chain.

The rotary unit 70 includes product carrying arms 77 adjacent to its outer circumference which are disposed at a distance from one another in the circumferential direction of the rotary unit 70 and which carry removal elements 78 of the rotary unit 70 each configured as a suction element, disposed on the outer circumference of the rotary unit 70.

Each product carrying arm 77 has a longitudinal rod 79 parallel to the axis of rotation of the rotary unit 70. Located on the radially outward-pointing side of the longitudinal rod 79 in the rotary unit 70 are five transverse rods 80 which are connected to the longitudinal rod 79 by a radially disposed connecting rod 81. Each transverse rod 80 carries three removal elements 78 disposed at a distance from one another on its radially outwardly pointing side in the rotary unit 70. Each removal element 78 is configured as a suction cup provided with an elastic bellows, which is fastened to the transverse rod 80. The longitudinal rod 79, the five transverse rods 80 and the five connecting rods 81 are configured as hollow profiles. The longitudinal rod 79 is connected by a radial connecting tube 83 disposed close to the drive star 74 to a vacuum distributor 83 located at the end of the hollow shaft 73. The product carrying arm 77 carries fifteen removal elements 78 configured as suction cups which are disposed in a plane parallel to the axis of rotation of the rotary unit 70. The fifteen suction cups are connected the in the product carrying arm 77. The suction lines run through the hollow transverse rods 80 and the hollow connecting rods 81 to the hollow longitudinal rod 79 and through the radial connecting tube 82 to the vacuum distributor 83.

The rotary unit 70 has nine product carrying arms 77 disposed at a distance from one another in the circumferential direction of the rotary unit 70. The rotary unit 70 rotates about its horizontal axis of rotation. In the region of the lower apex of the rotary unit 70, one product carrying arm 77 after the other is placed with its suction cups each provided with an elastic bellows through the rotary movement of the rotary unit 70 onto the baked product pieces which lie on the tong lower parts 71a of the opened baking tongs 71 which pass through the lower apex of the rotary unit 70.

FIGS. 7a to 7d each show a product carrying arm 77 of the rotary unit 70. FIG. 7a shows the product carrying arm 77 from the side, FIG. 7b shows said product carrying arm in front view, FIG. 7c shows it from above and FIG. 7d shows it in oblique view.

FIGS. 8a to 8d show another embodiment of the rotary unit of the product removal device in engagement with a circulating baking tong chain of the baking oven. FIG. 8a shows three consecutive opened baking tongs of a baking tong chain with the rotary unit projecting into the opened baking tongs from the rear side. FIG. 8b shows an oblique view of FIG. 8a. FIG. 8c shows the engagement of the rotary unit in the baking tong chain. FIG. 8d shows an oblique view of FIG. 8c.

The rotary unit 85 shown in FIGS. 8a and 8b projects into three consecutive opened baking tongs 86 of an endless baking tong chain of a baking oven. In FIGS. 8a and 8b the opened baking tongs 86 are only shown schematically. The rotary unit 85 is disposed in the opened baking tongs 86 above the tong lower parts 86a and extends with its front side close to the folded-upwards tong upper parts 86b. The rotary unit 85 is rotatably mounted on its rear side in a retaining device 87 fastened to the oven frame. The retaining device 87 is fastened in a height-adjustable manner on the oven frame. The rotary unit 85 has a drive star 88 disposed on the rear side of the rotary frame 85 which has arms 89 arranged in a star shape, which carry rotatably mounted drive rollers 90 on its end sections which engage in the intermediate spaces located in the baking tong chain between the tong lower parts 86a of the baking tongs 86. In the baking tongs 86 the tong lower parts 86a are provided at the front and rear edges with strips 91, 92 projecting over the tong lower parts 86a against which the drive rollers 90 of the rotary unit 85 abut.

FIGS. 9a to 9d show a removal element of the rotary unit which is configured as a suction sleeve which can be pushed elastically into itself. FIG. 9a shows the suction sleeve from the side, FIG. 9b shows a vertical section through the suction sleeve, FIG. 9c shows the suction sleeve in oblique view and FIG. 9d shows a plan view of the suction sleeve. The suction sleeve 94 has two coaxial tube pieces 94a and 94b which can be inserted telescopically into one another and a compression spring 95 which pushes the two tube pieces 94a and 94b apart in the interior of the suction sleeve 94. The inner tube piece 94b carries a suction plate 96 disposed on the free end of the suction sleeve 94.

FIGS. 10a to 10b show a removal element of the rotary unit which is configured as a suction cup 97 provided with an elastic bellows 96. FIG. 10a shows the suction cup from the side, FIG. 10b shows a vertical section through the suction cup, FIG. 10c shows the suction cup in oblique view and FIG. 10d shows a plan view of the suction cup.

FIGS. 11 to 14 show an advantageous design for the lateral guidance of the baking tong carriage. It was known from the prior art to guide the running wheels of the baking tong carriage by means of wheel flanges on the running rails. This resulted in more rapid wear of the running bearings of the running wheels and the wheel flanges. The design shown in FIGS. 11 to 14 avoids the disadvantages described and extends the stability.

Figure 11:
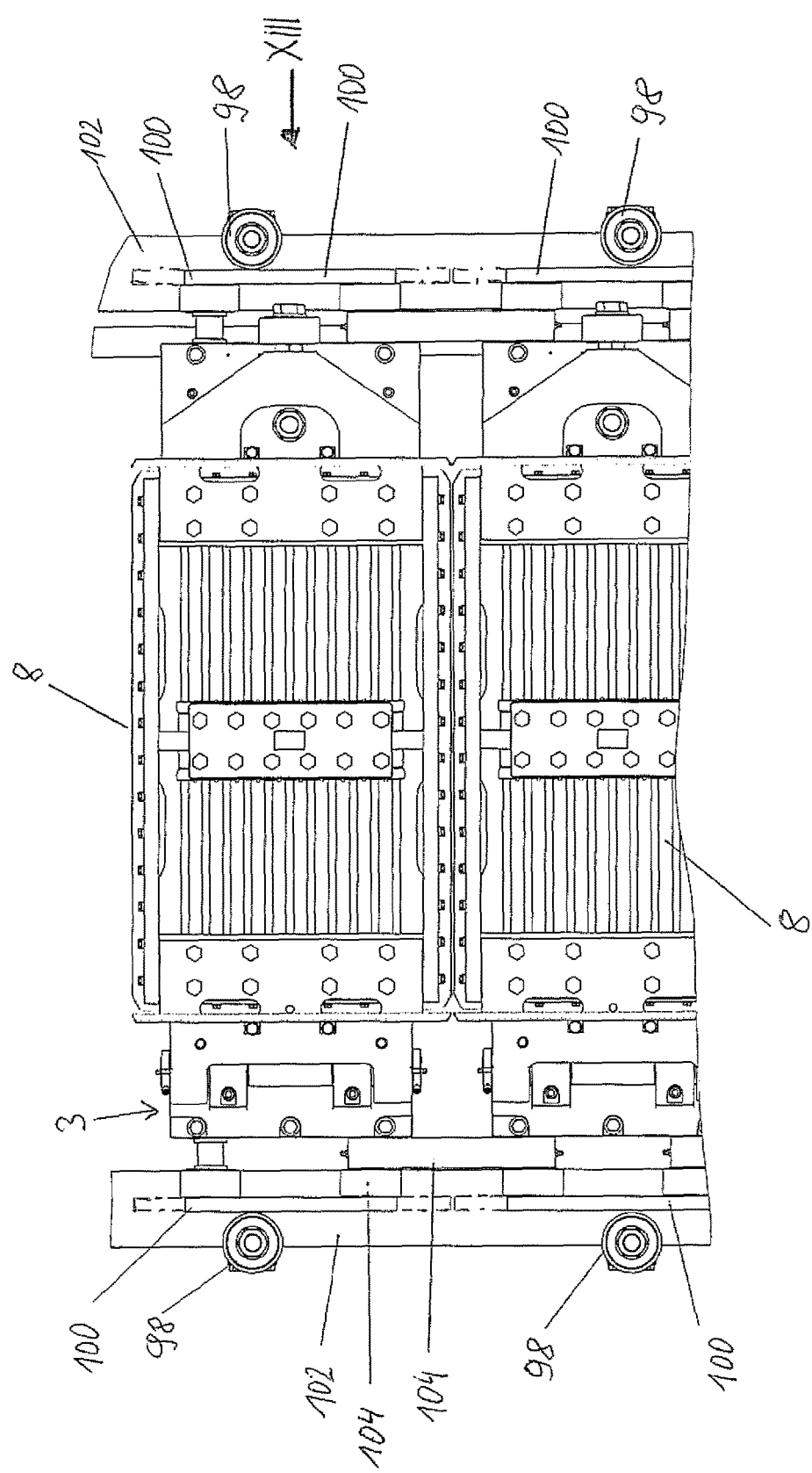
FIG. 11 shows a plan view of a section of the baking tong chain.
Figure 12:
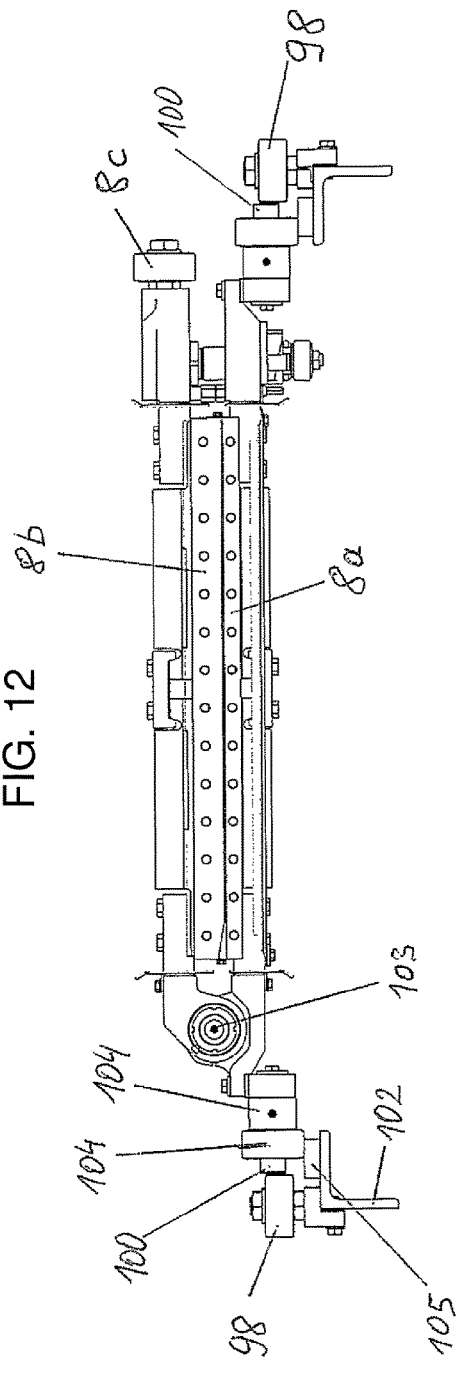
FIG. 12 shows a view of a baking tong viewed in the direction of travel of the baking tongs.
Figure 14:
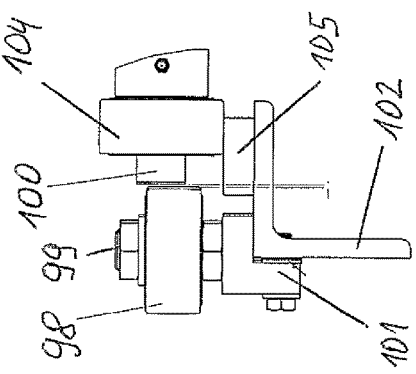
FIG. 14 shows a detail.
Figure 13:
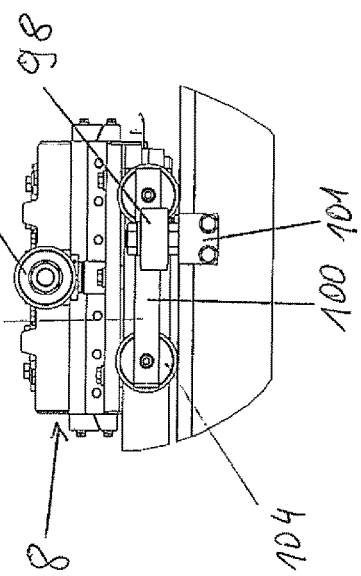
FIG. 13 shows the side view according to arrow XIII in FIG. 11

FIG. 11 shows the plan view of a section of an arrangement of two consecutively disposed baking tongs 8 along a baking tong chain 3. For better and low-wear guidance of the baking tong carriage, laterally disposed running bearings 98 are provided which are mounted on vertical axles 99 and which laterally guide the baking tongs over guide lugs 100. The axles 99 sit on receiving panels 101 and the exact positioning of the running bearing 98 on the angle carrier 102 can be adjusted by an adjusting screw or an adjusting plate. The guidance via the guide lugs 100 can be adjusted with an adjustable play as indicated in FIG. 14.

The guide lugs 100 can be configured to be short or longer in their longitudinal extension and specifically adapted to the travel speed of the wafer oven. The number of laterally disposed running bearings 98 can also be increased to ensure a more exact lateral guidance. For example, in the region before the deflection of the tong carriage, the number of lateral guides and therefore the number of running bearings 98 can be increased in order to ensure a problem-free deflection.

Other than in the previously known running rollers with wheel flange, the ball bearings of the running rollers 104 running on the rails 105 are only radially loaded, with the result that the lifetime increases. The running bearings can easily be exchanged in the case of a malfunction.

The other machine parts shown in FIGS. 11 to 14 are self-explanatory in view of the above explanations. As can be seen from FIG. 12, each baking tong comprises an upper baking plate 8b and a lower baking plate 8a. Both baking plates are pivotably connected via the joint 103. The opening and reclosing of the baking tong 8 is accomplished via the running roller 8c of the upper baking plate, as is prior art.

It can also be seen in FIG. 11 that the baking tongs 8 suspended on one another to form the baking tong chain are connected to one another by means of connecting lugs 104. The length of the guide lugs 100 is shown completely in its short form. The dashed lines indicate that the guide lugs can also be configured to be sufficiently long that they almost touch the guide lugs of the neighbouring baking tongs.

The invention claimed is:

1. A baking oven for producing baking products, the baking oven comprising:
a front oven part;
a rear oven part;
an oven frame having an external thermal insulation;
a baking chamber disposed inside said thermal insulation;
an endless baking tong chain circulating continuously in the baking oven and moving through said baking chamber, said endless baking tong chain being disposed along an orbit closed in itself and extending through two superposed transport levels through said front and rear oven parts, said endless baking tong chain containing baking tongs which can be opened and closed and which can be locked in a closed state, said baking tongs containing baking molds having plate-shaped baking mold upper parts and plate-shaped baking mold lower parts for baking therebetween plate-shaped baking products, said baking molds being opened by opening said baking tongs and closed by closing said baking tongs, and said baking tong chain having intermediate spaces between said baking tongs;
a device for unlocking said baking tongs disposed in said front oven part on said orbit of said endless baking tong chain;
a device for opening said baking tongs disposed along an upper transport level of said two superposed transport levels;
a dispensing station, a loading station, a device for closing said baking tongs and a device for locking said baking tongs disposed consecutively in a running direction of said baking tongs;
a product removing device disposed in said dispensing station for removing the plate-shaped baked products from opened baking molds;
an upper transport device for removing the plate-shaped baked products following said product removing device;
a vacuum source;
vacuum lines; and
said product removing device having a horizontally disposed rotary unit being rotatable about a horizontal axis of rotation, and projecting into said opened baking tongs, said horizontally disposed rotary unit carrying removal elements disposed along an outer circumference of said horizontally disposed rotary unit, said removal elements being disposed consecutively on said outer circumference of said horizontally disposed rotary unit in at least one longitudinal row extending along said outer circumference of said horizontally disposed rotary unit, said removal elements being suction elements connected to said vacuum source, wherein said horizontally disposed rotary unit is disposed in a height-adjustable manner in said front oven part and said horizontally disposed rotary unit has radially projecting drive lugs outwardly projecting on said outer circumference, and drive rollers rotatably mounted on free ends of said outwardly projecting drive lugs and disposed to project into said endless baking tong chain and to engage in said intermediate spaces of said endless baking tong chain between said baking tongs; and wherein a plurality of said suction elements are disposed to simultaneously engage respective plate-shaped baked products and transfer the plate-shaped baked products from said baking molds to said upper transport device.

2. The baking oven according to claim 1, wherein said horizontally disposed rotary unit has at least two product carrying arms, said at least two product carrying arms disposed at a distance from one another along said outer circumference of said horizontally disposed rotary unit, wherein each of said two product carrying arms carries at least one of said removal elements configured as said suction element.

3. The baking oven according to claim 2, wherein each of said product carrying arms has at least one rod which carries at least two of said removal elements configured as said suction elements, which are disposed along said rod at a distance from one another.

4. The baking oven according to claim 2, wherein each of said product carrying arms has at least one longitudinal rod disposed parallel to an axis of rotation of said horizontally disposed rotary unit, said longitudinal rod carrying at least one of said removal elements configured as said suction element.

5. The baking oven according to claim 4, wherein said longitudinal rod carries at least two of said removal elements configured as said suction elements, said removal elements disposed along said longitudinal rod at a distance from one another.

6. The baking oven according to claim 4, wherein said product carrying arms each have at least two longitudinal rods disposed parallel to the axis of rotation of said horizontally disposed rotary unit, said longitudinal rods are disposed in a reference plane parallel to the axis of rotation of said horizontally disposed rotary unit, and that said longitudinal rods carry said removal elements configured as said suction elements, which are disposed perpendicular to the reference plane.

7. The baking oven according to claim 2, wherein said product carrying arms each have a longitudinal rod disposed parallel to an axis of rotation of said horizontally disposed rotary unit, said longitudinal rod carrying at least one transverse rod disposed transversely to said longitudinal rod, said transverse rod is disposed in a reference plane parallel to the axis of rotation of said horizontally disposed rotary unit, and said transverse rod carrying at least two of said removal elements configured as said suction elements, and are disposed along said transverse rod at a distance from one another.

8. The baking oven according to claim 7, wherein said longitudinal rod carries at least two transverse rods disposed at a distance from one another, said transverse rods are disposed in the reference plane parallel to the axis of rotation of said horizontally disposed rotary unit, and that each of said transverse rods carries at least two of said removal elements configured as said suction elements, said removal elements are disposed at a distance from one another along said transverse rod and are each disposed perpendicular to the reference plane.

9. The baking oven according to claim 2, wherein said product carrying arms each have at least two longitudinal rods disposed parallel to an axis of rotation of said horizontally disposed rotary unit, said longitudinal rods are disposed in a reference plane parallel to the axis of rotation of said horizontally disposed rotary unit and said product carrying arms have at least two transverse rods disposed transversely to said longitudinal rods which each carry at least two of said removal elements configured as said suction elements, which are disposed at a distance from one another along said transverse rod and are each disposed perpendicular to the reference plane.

10. The baking oven according to claim 2, wherein said product-carrying arms are each configured as hollow profiles and form a part of said suction lines which lead from said removal elements configured as said suction elements, attached to said product carrying arms to said vacuum source.

11. The baking oven according to claim 2, wherein said removal elements disposed on said outer circumference of said horizontally disposed rotary unit are configured as suction cups.

12. The baking oven according to claim 2, wherein said removal elements disposed on said outer circumference of said horizontally disposed rotary unit are configured as suction sleeves which can be pushed together elastically into themselves, and are attached to said product carrying arms and are connected via said suction lines to said vacuum source.

13. The baking oven according to claim 1, wherein said horizontally disposed rotary unit has at least one vertically disposed rotary star which carries said removal elements configured as said suction elements, disposed on said outer circumference of said horizontally disposed rotary unit.

14. The baking oven according to claim 13, wherein said vertically disposed rotary star has straight segments and an outer circumference configured as a polygon, in which said removal elements configured as said suction elements are disposed on said straight segments.

15. The baking oven according to claim 14, wherein in each case at least two of said removal elements configured as said suction elements are disposed at a distance from one another on said straight segments of said outer circumference.

16. The baking oven according to claim 13, wherein said vertically disposed rotary star is configured as a hollow body and forms a part of said suction lines which lead from said removal elements configured as said suction elements to said vacuum source.

17. The baking oven according to claim 13, wherein said removal elements of said horizontally disposed rotary unit configured as said suction elements are configured as suction cups which are attached to said outer circumference of said vertically disposed rotary star and connected via said suction lines to said vacuum source.

18. The baking oven according to claim 13, wherein said removal elements of said horizontally disposed rotary unit configured as said suction elements are configured as suction sleeves which can be pushed elastically into themselves, which are attached to said outer circumference of said vertically disposed rotary star and connected via said suction lines to said vacuum source.

19. The baking oven according to claim 11, wherein said suction cups have elastic bellows attached to said product carrying arms and are connected via said suction lines to said vacuum source.

20. The baking oven according to claim 1, wherein said horizontally disposed rotary unit has at least two vertically disposed rotary star which carry said removal elements configured as said suction elements, disposed on the circumference of said horizontally disposed rotary unit, said vertically disposed rotary stars {66} disposed adjacent to one another at a distance.

21. The baking oven according to claim 17, wherein said suction cups each have an elastic bellows.

22. The baking oven according to claim 1, wherein the baking oven produces crispy-brittle baking products.

* * * * *